(12) United States Patent  
Sheynblat

(10) Patent No.: US 8,977,300 B2
(45) Date of Patent: *Mar. 10, 2015

(54) LOCATION-AWARE MULTIMODAL COMMUNICATION SYSTEM

(75) Inventor: Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,909

(22) Filed: Sep. 13, 2012

(65) Prior Publication Data

US 2013/0040637 A1 Feb. 14, 2013

Related U.S. Application Data

(63) Continuation of application No. 11/479,624, filed on Jun. 29, 2006, which is a continuation-in-part of application No. 11/332,116, filed on Jan. 12, 2006, now Pat. No. 7,821,449.

(60) Provisional application No. 60/643,562, filed on Jan. 12, 2005.

(51) Int. Cl.
*H04W 24/00* (2009.01)
*H04W 4/00* (2009.01)
(Continued)

(52) U.S. Cl.
CPC .............. *H04W 48/16* (2013.01); *G01S 5/0236* (2013.01); *H04W 48/18* (2013.01); *H04W 88/06* (2013.01)
USPC .................. 455/456.6; 455/456.1; 455/426.1; 370/338

(58) Field of Classification Search
USPC .......... 455/404.2, 435.2, 414.1–414.2, 422.1, 455/426.1, 443–444, 448–449, 456.1–457, 455/524–525; 370/338
See application file for complete search history.

(56) References Cited

U.S. PATENT DOCUMENTS 5,862,480 A 1/1999 Wild et al.
6,941,143 B2 9/2005 Mathur
(Continued)

FOREIGN PATENT DOCUMENTS

EP 0980190 A1 2/2000
GB 2391767 2/2004
(Continued)

OTHER PUBLICATIONS

European Search Report—EP11191628—Search Authority—Munich—Jan. 12, 2012.
(Continued)

*Primary Examiner* — Michael Mapa
(74) *Attorney, Agent, or Firm* — Arnold J. Gum

(57) ABSTRACT

A system and method for providing a multimodal list of transceiver devices to a remote terminal is disclosed. A positioning unit determines a location of a remote terminal. A processor identifies transceivers for communicating in at least a first communication mode and a second communication mode according to the location of the remote terminal. The processor retrieves information about the identified transceivers from a database and generates a multimodal list. The processor causes a transceiver to transmit the multimodal list of transceiver devices to the remote terminal using a communication mode of the remote terminal.

80 Claims, 10 Drawing Sheets

(51) Int. Cl.
*H04W 48/16* (2009.01)
*G01S 5/02* (2010.01)
*H04W 48/18* (2009.01)
*H04W 88/06* (2009.01)

(56) References Cited

U.S. PATENT DOCUMENTS

| | | | |
|---|---|---|---|
| 6,941,146 | B2 | 9/2005 | Knauerhase et al. |
| 7,076,256 | B1 | 7/2006 | Orler et al. |
| 7,286,838 | B2 | 10/2007 | Knauerhase et al. |
| 7,359,706 | B2 | 4/2008 | Zhao |
| 7,821,449 | B2 | 10/2010 | Sheynblat |
| 2003/0050070 | A1* | 3/2003 | Mashinsky et al. ........... 455/452 |
| 2003/0081567 | A1 | 5/2003 | Okanoue et al. |
| 2003/0176196 | A1 | 9/2003 | Hall et al. |
| 2003/0220116 | A1* | 11/2003 | Sagefalk et al. ........... 455/456.1 |
| 2004/0082311 | A1 | 4/2004 | Shiu et al. |
| 2004/0203904 | A1* | 10/2004 | Gwon et al. ................ 455/456.1 |
| 2004/0219930 | A1* | 11/2004 | Lin ............................. 455/456.1 |
| 2004/0259546 | A1* | 12/2004 | Balachandran et al. ... 455/435.2 |
| 2005/0078033 | A1* | 4/2005 | Tamaki et al. ................ 342/463 |
| 2005/0111409 | A1 | 5/2005 | Spear et al. |
| 2005/0186967 | A1* | 8/2005 | Ozluturk .................... 455/456.1 |
| 2005/0239443 | A1 | 10/2005 | Watanabe et al. |
| 2006/0092890 | A1* | 5/2006 | Gupta et al. .................. 370/338 |
| 2006/0293052 | A1 | 12/2006 | Orler et al. |
| 2007/0161401 | A1 | 7/2007 | Sheynblat |
| 2010/0097996 | A1 | 4/2010 | Sheynblat |
| 2012/0179660 | A1 | 7/2012 | Sheynblat |

FOREIGN PATENT DOCUMENTS

| | | |
|---|---|---|
| JP | 2002374259 A | 12/2002 |
| JP | 2003134133 A | 5/2003 |
| JP | 2003259457 A | 9/2003 |
| JP | 2003319454 A | 11/2003 |
| JP | 2004140459 A | 5/2004 |
| JP | 2004207822 A | 7/2004 |
| JP | 2004289487 A | 10/2004 |
| JP | 2005286864 A | 10/2005 |
| JP | 2007501591 T | 1/2007 |
| WO | 9013211 A1 | 11/1990 |
| WO | 2005004527 | 1/2005 |
| WO | 2005004528 | 1/2005 |
| WO | 2005043940 A1 | 5/2005 |
| WO | 2005051019 A1 | 6/2005 |

OTHER PUBLICATIONS

International Search Report—PCT/US06/026190, International Search Authority—European Patent Office, Dec. 11, 2006.
Written Opinion—PCT/US06/026190, International Search Authority—European Patent Office, Dec. 11. 2006.

* cited by examiner

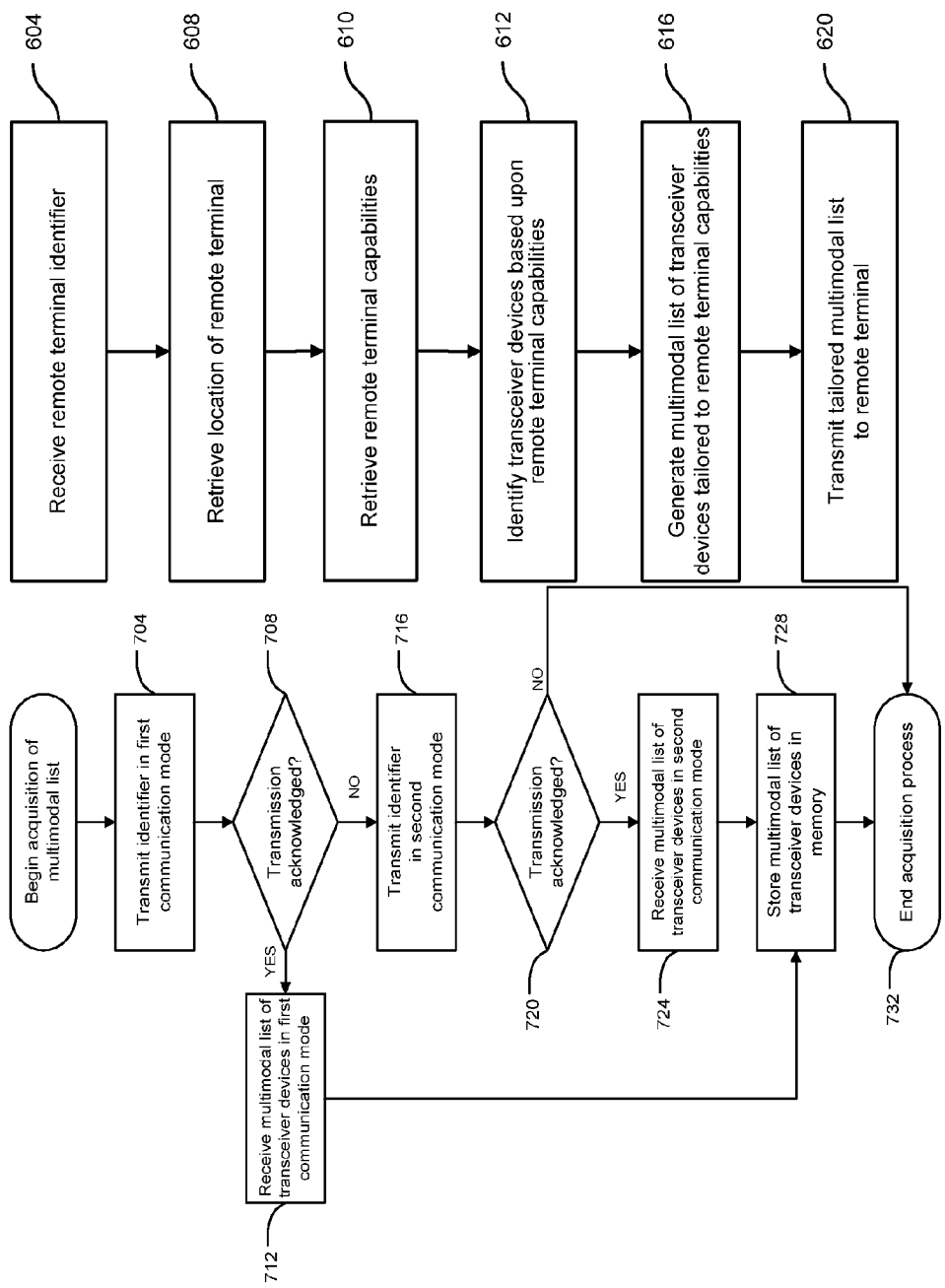

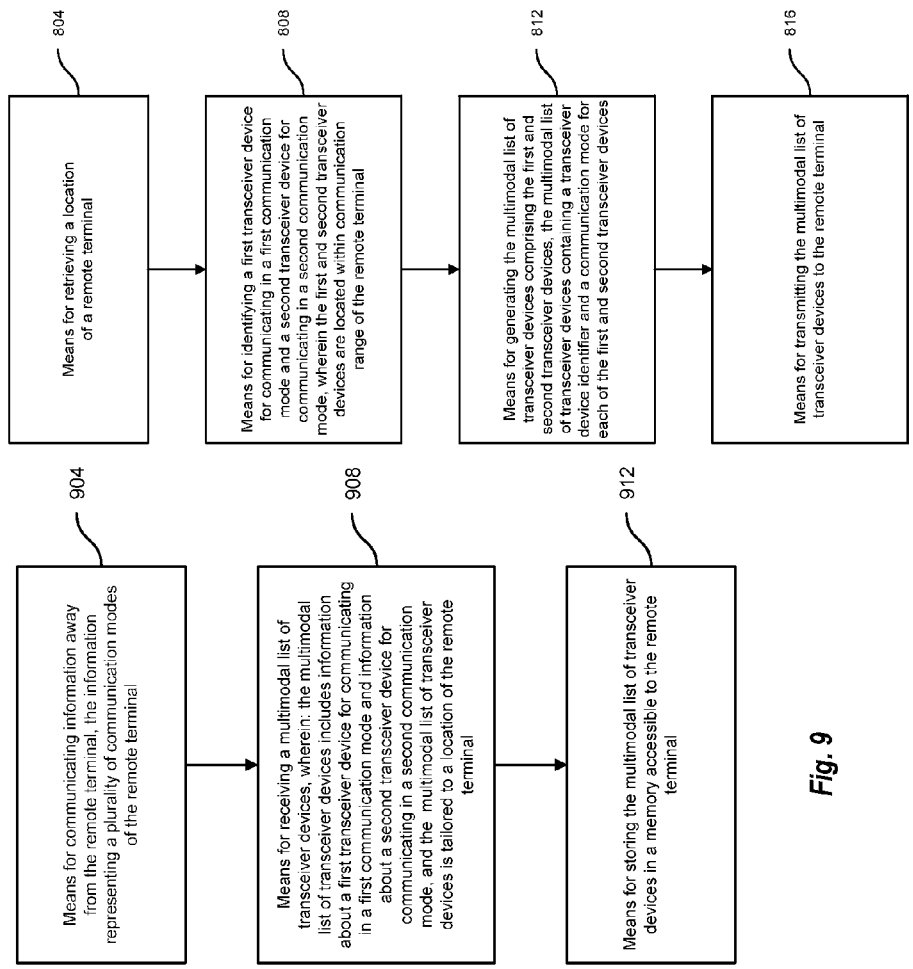

LOCATION-AWARE MULTIMODAL COMMUNICATION SYSTEM

CLAIM OF PRIORITY UNDER 35 U.S.C. §119

The present application for patent is a continuation application of, and claims priority to, U.S. patent application Ser. No. 11/479,624, entitled "LOCATION-AWARE MULTIMODAL COMMUNICATION SYSTEM," and filed Jun. 29, 2006, which is a continuation-in-part of U.S. application Ser. No. 11/332,116, entitled "BASE STATION ALMANAC ASSISTED POSITIONING," granted as U.S. Pat. No. 7,821,449, and filed on Jan. 12, 2006, which claims priority to U.S. Provisional Application Ser. No. 60/643,562, entitled "BASE STATION ALMANAC ASSISTED POSITIONING," and filed Jan. 12, 2005, all of which are assigned to the assignee hereof, and expressly incorporated herein by reference.

BACKGROUND

This disclosure relates in general to communication systems and, more specifically, but not by way of limitation, to identifying communication resources based upon a location of a communication device.

Mobile devices with more than one communication mode have proliferated in the marketplace. Cellular phones, for example, may contain one transceiver for exchanging voice and data communications with a cellular base station and another transceiver for communicating with a WiFi™ access point. Some phones offer many more communication modes. To determine the access points within communication range of the phone can take time and processing power and impede the ability to move between access points.

Conventional mobile devices may receive a list of surrounding base stations from a serving base station. This list enables the mobile device to change positions without interrupting service. However, the list is limited to information about base stations owned by a particular service provider or those owned by the service provider's roaming partners. Moreover, information contained in the list may be limited to a specific communication mode of the mobile device.

BRIEF SUMMARY OF THE DISCLOSURE

In one embodiment, a method of providing a multimodal list of transceiver devices to a remote terminal is disclosed. The method includes retrieving a location of a remote terminal that is able to communicate with a plurality of transceiver devices and that communicates in at least two communication modes. The method further includes identifying a first transceiver device for communicating in a first communication mode and a second transceiver device for communicating in a second communication mode. The first and second transceiver devices are located within a communication range of the remote terminal and communicate in different communication modes. The method also includes generating the multimodal list of transceiver devices comprising the first and second transceiver devices where the multimodal list contains a transceiver identifier and a communication mode for each of the first and second transceiver devices. The multimodal list of transceiver devices is transmitted to the remote terminal in a communication mode of the remote terminal.

In another embodiment, a method of identifying transceiver devices for communicating with a remote terminal is disclosed. The method includes communicating information corresponding to a plurality of communication modes of the remote terminal away from the remote terminal. The method also includes receiving a multimodal list of transceiver devices. The multimodal list of transceiver devices includes information about a first transceiver device for communicating in a first communication mode and information about a second transceiver device for communicating in a second communication mode. In addition, the multimodal list of transceiver devices is tailored to a location of the remote terminal. The method further includes storing the multimodal list of transceiver devices in a memory accessible to the remote terminal.

In yet another embodiment, a system for providing a multimodal list of transceiver devices to a remote terminal is disclosed. The system includes a positioning unit for determining a location of the remote terminal and a database of transceiver device information. The transceiver device information is characterized by, at least, a transceiver identifier, a location of the transceiver device, and a communication mode of the transceiver device. The system also includes a processor configured to retrieve transceiver device information from the database and to create a multimodal list of transceiver devices. The multimodal list of transceiver devices contains information about a first transceiver device having a first communication mode and a second transceiver device having a second communication mode. In addition, the multimodal list of transceiver devices is tailored to the location of the remote terminal. The system also includes a transceiver configured to transmit the multimodal list of transceiver devices to the remote device using a communication mode of the remote device.

In another embodiment, a system for identifying transceiver devices for communicating with a remote terminal is disclosed. The system includes a first transceiver for communicating in a first communication mode and a second transceiver for communicating in a second communication mode. The system also includes a processor coupled with the first and second transceivers and configured to process communications in the first and second communication modes. A memory coupled with the processor is provided to store a multimodal list of transceiver devices. The multimodal list of transceiver devices includes information about a first transceiver device for communicating in a first communication mode and information about a second transceiver device for communicating in a second communication mode. The multimodal list of transceiver devices is received by the remote terminal in a communication mode of the remote terminal.

In a further embodiment, a system for providing a multimodal list of transceiver devices to a remote terminal is disclosed. The system includes means for retrieving a location of a remote terminal as well as means for identifying a first transceiver device for communicating in a first communication mode and a second transceiver device for communicating in a second communication mode. The first and second transceiver devices are located within communication range of the remote terminal. The system also includes means for generating the multimodal list of transceiver devices comprising the first and second transceiver devices. The multimodal list of transceiver devices contains, at least, a transceiver device identifier and a communication mode for each of the first and second transceiver devices. Means for transmitting the multimodal list of transceiver devices to the remote terminal are provided.

In another embodiment, a system for identifying transceiver devices for communicating with a remote terminal is disclosed. The system includes means for communicating information away from the remote terminal. The information communicated away from the terminal represents a plurality of communication modes of the remote terminal. Means for receiving a multimodal list of transceiver devices are included. The multimodal list of transceiver devices contains information about a first transceiver device for communicating in a first communication mode and information about a second transceiver devices for communicating in a second communication mode. In addition, the multimodal list of transceiver devices is tailored to a location of the remote terminal. Means for storing the multimodal list of transceiver devices in a memory accessible to the remote terminal are included.

Further areas of applicability of the present invention will become apparent from the detailed description provided hereinafter. It should be understood that the detailed description and specific examples, while indicating various embodiments of the invention, are intended for purposes of illustration only and are not intended to necessarily limit the scope of the invention.

BRIEF DESCRIPTION OF THE DRAWINGS

The present disclosure is described in conjunction with the appended figures:

FIGS. 6A and 6B are flow diagrams illustrating a process of providing a multimodal list of transceiver devices to a remote terminal.

FIG. 7 is a flow diagram of a process by which transceiver devices are identified for communicating with a remote terminal.

FIG. 8 is a block diagram of a system for providing a multimodal list of transceiver devices to a remote terminal.

FIG. 9 is a block diagram of a system for identifying transceiver devices for communicating with a remote terminal.

Figure 1:
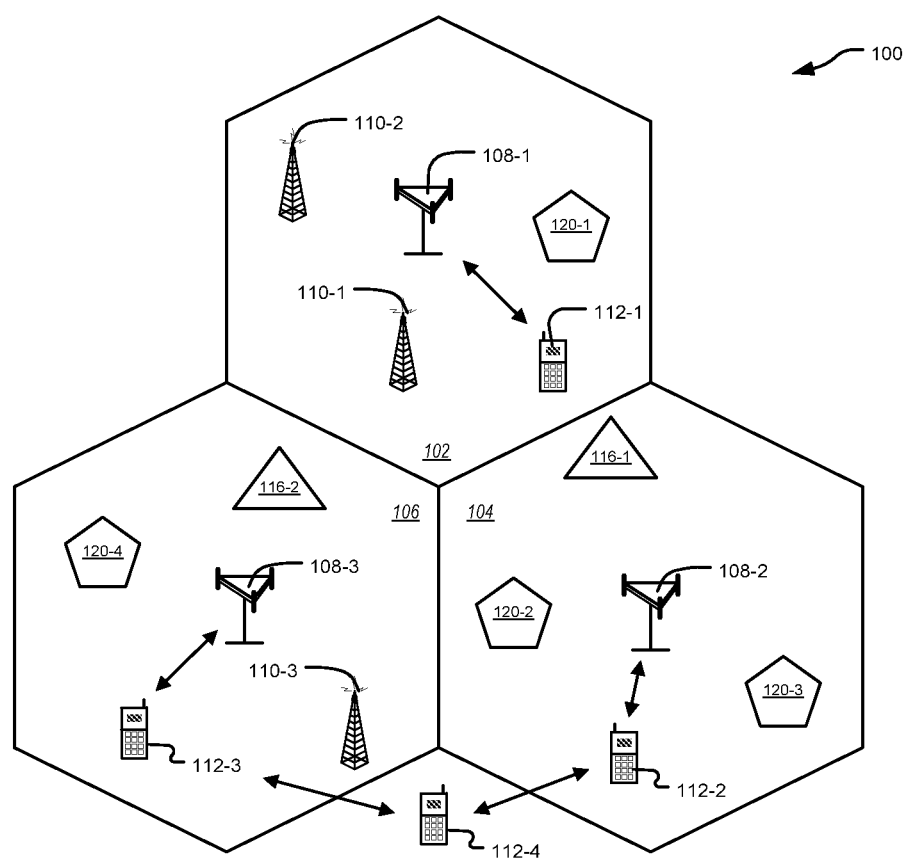
FIG. 1 is a diagram of a multimodal communication system showing interaction between mobile devices and base stations.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

As disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Moreover, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 1 is a diagram of a multimodal communication system. In this system, a mobile device 112-1, 112-2, 112-3, 112-4 exchanges voice and/or data communications with surrounding transceiver devices 108, 110, 112, 116, 120 according to a communication mode and a communication range of the mobile device 112. Transceivers devices 108, 110, 112, 116, 120 support different communication modes or combinations of communication modes. As used herein, transceiver devices include such things as cellular base stations, various radio networks, wireless wide area networks, wireless local area networks, wireless personal area networks, mesh networks, Bluetooth devices, and other communication devices that can exchange voice and/or data communications with a mobile device or fixed-location device.

Some transceivers 108, 110, 112, 116, 120 can operate in mesh, point-to-point and star network modes. For example, the fourth mobile device 112-4 can communicate in a mesh or peer-to-peer fashion with the second and third mobile devices 112-2, 112-3. In this way, the fourth mobile device 112-4 can communicate with the second or third base stations 108-2, 108-3. Additionally, the fourth mobile device could communicate directly with base stations 108 when within a cellular region 102, 104, 106 in a star mode. With a transceiver 108, 110, 112, 116, 120 that operates in multiple communication modes, some modes may be star and other modes mesh. A multimodal list for a mobile device 112 could include transceivers 108, 110, 112, 116, 120 that operate mesh, point-to-point and star network modes.

In this embodiment, mobile devices 112 are cellular telephones and each mobile device 112-1, 112-2, 112-3 is capable of communicating in at least two different communication modes. Communication modes may include, for example, various combinations of CDMA (Code Division Multiple Access), WCDMA (Wideband Code Division Multiple Access), GSM (Global System for Mobile communication), TDMA (Time Division Multiple Access), OFDM (Orthogonal Frequency Division Multiplexing), GPRS (General Packet Radio Service), EV-DO (Evolution Data Optimized), WUSB (Wireless Universal Serial Bus), UWB (Ultra-Wideband), WiFi™ (IEEE 802.11), WiMAX (IEEE 802.16), ZigBee™, and/or satellite protocols. In other embodiments, mobile devices may be different and may include such things as child or parolee monitors, navigational equipment, personal navigation devices (PND), tracking devices, wireless pagers, wireless computers, smartphones, voice over IP (VOIP) terminals and terminal adapters, personal computers, laptops, and personal data assistants.

As illustrated, each mobile device 112-1, 112-2, 112-3 communicates with a base station 108-1, 108-2, 108-3 according to a location of the mobile device 112. In addition, each base station 108 has a footprint that defines a communication range of the base station. For example, base station 108-1 communicates with devices in cellular region 102 whereas base station 108-2 communicates with devices in cellular region 104. In some embodiments, cellular regions 102, 104, 106 are further divided into sectors and base stations 108 are configured to communicate with mobile devices 112 located in a particular sector of a cellular region 102, 104, 106.

Upon activation, a mobile device 112 may listen for a base station 108 or other transceiver device 110, 112, 116, 120 in its surrounding environment. For example, mobile device 112-1 may listen for a signal from base station 108-1 when the mobile device 112-1 is first activated. When the signal is detected, mobile device 112-1 may transmit identifying information to base station 108-1. The identifying information may specify, for example, capabilities of the mobile device 112, including communication modes supported by the mobile device 112. Alternatively, the identifying information may be a shorthand description of a type of mobile device 112, for example, a serial number or model number. In this case, base station 108-1 (or another remote entity connected to the base station 108-1) may use the shorthand description to access additional information about mobile device 112-1 from a device capabilities database.

Base station 108-1 also retrieves a geographic position of mobile device 112-1. In some embodiments, the geographic position of mobile device 112-1 is provided to base station 108-1 by the use of a global positioning satellite system. In other embodiments, the geographic position may be determined using a ranging signal and may involve interaction with one or more different transceiver devices 108, 110, 112, 116, 120 within a communication range of mobile device 112-1. In still further embodiments, mobile device 112-1 may assist in the process of determining its location by sending positioning data to the transceiver device 108, 110, 112, 116, 120. In yet another example, the position of the mobile device 112-1 may be derived from the identity (or knowledge) of the transceiver device 108, 110, 112, 116, 120 in communication with the mobile device 112-1. Knowing the location and communication range of the transceiver device 108, 110, 112, 116, 120 allows approximating a location of the mobile device 112-1 since the mobile device 112-1 is in communication range of the transceiver device 108, 110, 112, 116, 120.

When mobile device 112-1 has been identified and its geographic location has been determined, base station 108-1 or some other transceiver device 108, 110, 112, 116, 120 generates a multimodal list of transceiver devices within a likely communication range of mobile device 112-1. The multimodal list includes information about one or more transceiver devices 108, 110, 112, 116, 120 that communicate in any of the different communication modes supported by the mobile device 112-1. In some embodiments, information contained in the multimodal list includes a transceiver device identifier and a communication mode of the transceiver device. In other embodiments, the multimodal list may include additional, connection-oriented information. For example, information about a WiFi access point may include an SSID, an IP address and an operating frequency. Some embodiments include locations for the other transceiver devices 108, 110, 112, 116, 120 in the multimodal list. In one example, geographic location determination may involve identification of the base station 108 or transceiver 110, 112, 116, 120 in communication with the mobile device 112-1.

Base station 108-1 transmits the multimodal list of transceiver devices to mobile device 112-1. In other embodiments, any transceiver device 108, 110, 112, 116, 120 within communication range of the mobile device 112-1 could send the multimodal list. The multimodal list of transceiver devices may include all transceiver devices 108, 110, 112, 116, 120 known to base station 108-1 that are within a likely communication range of mobile device 112-1 or a subset of these transceiver devices. For example, base station 108-1 may have access to information about transceiver devices in cellular region 102 and adjoining cellular regions 104, 106. Based upon the location of mobile device 112-1 and a range of each communication mode of each transceiver device 108, 110, 112, 116, 120, base station 108-1 may determine that transceivers 116-1, 120-1, and 110-1 are within a likely communication range of mobile device 112-1. Alternatively, any of the transceiver devices 108, 110, 112, 116, 120 may have access to the information about other transceiver devices and provide it to the mobile device 112-1 when the mobile device is in the communication range of that transceiver.

In some embodiments, base station 108-1 includes all transceivers in the multimodal list without regard to communication modes of mobile device 112-1. Thus, for example, mobile device 112-1 may receive information about Bluetooth™ transceivers in a multimodal list regardless of whether the mobile device 112-1 can communicate with Bluetooth™ devices. Other embodiments, however, tailor the multimodal list according to communication modes of mobile device 112-1. In this situation, Bluetooth™ transceivers would not be included in the multimodal list if mobile device 112-1 lacked the ability to communicate with these devices. In general, however, the multimodal list includes information about transceiver devices 108, 110, 112, 116, 120 for communicating in at least two different communication modes.

In one embodiment, the multimodal list may eliminate the need for mobile device 112-1 to scan communication modes for transceiver devices 108, 110, 112, 116, 120 upon changing location. This may save time and battery power and may help to avoid service interruptions. For example, by referring to the multimodal list, mobile device 112-1 may be able to quickly hop among individual WiFi™ access points as it moves through a metropolitan area. Similarly, mobile device 112-1 may be able to rapidly transition between communicating with a Bluetooth™ device, cellular base station, and WiFi™ access point without separately scanning for transceiver devices in each of these communication modes. In some embodiments, base station 108-1 prioritizes the multimodal list of transceiver devices according to a communication mode of a transceiver device, a relative location of the transceiver device, favored communication modes, roaming partners in a service agreement, and/or user-specified criteria.

Figure 2:
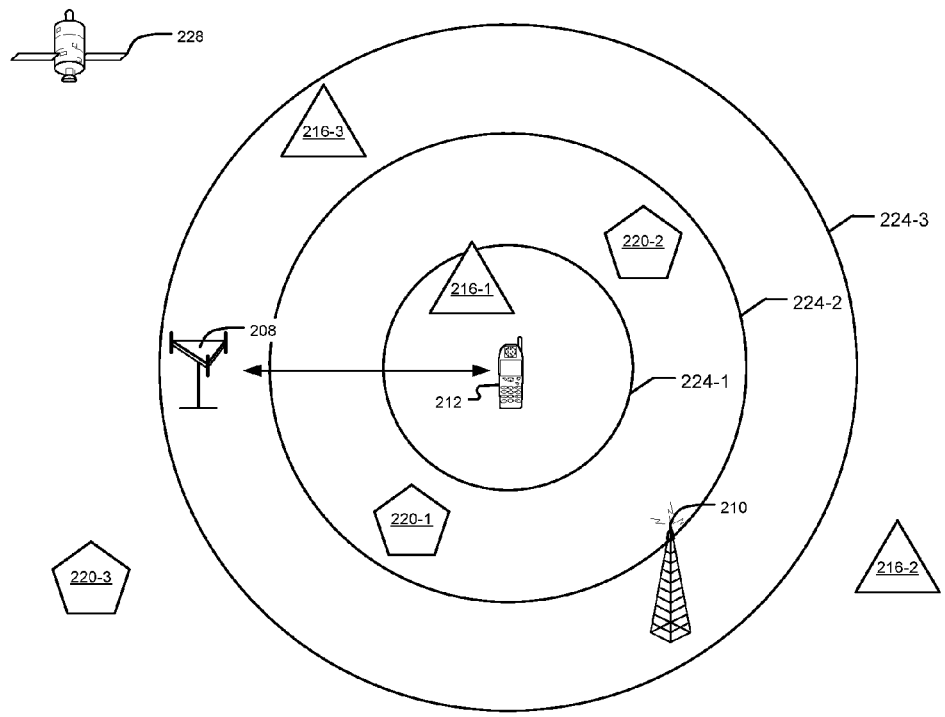
FIG. 2 is a diagram of a multimodal communication system showing various transceiver devices within a communication range of a mobile device.

FIG. 2 is a multimodal communication system showing transceivers disposed in an operating environment of a mobile device 212. Multiple transceiver devices 208, 210, 216, 220, 228 for exchanging voice and data communications in different communication modes are shown at various distances from mobile device 212. Initially, mobile device 212 may be unaware of the surrounding transceiver devices 208, 210, 216, 220, 228 or may lack the information needed to communicate with these transceiver devices 208, 210, 216, 220, 228. This embodiment is able to communicate between the mobile device 212 and a satellite 228 in one communication mode as explained more fully below.

As shown, mobile device 212 is capable of communicating in three different communication modes in this embodiment. The communication range of these different communication modes is represented by concentric circles 224-1, 224-2, 224-3 extending from a location of the mobile device 212 that generally indicate the theoretical range of the communication modes. A first concentric circle 224-1 corresponds to a short-range communication mode of mobile device 212 and may include, for example, communications from Bluetooth™ devices. Thus, the radius of concentric circle 224-1 may be approximately ten meters to signify a range over which Bluetooth™ and other personal area devices normally communicate. Bluetooth™ devices 216 located within concentric circle 224-1 are potentially within a communication range of mobile device 212, whereas Bluetooth™ devices 216 located outside concentric circle 224-1 may be beyond the communication range of mobile device 212. As illustrated, Bluetooth™ device 216-1 is within a likely communication range of mobile device 212 whereas Bluetooth™ devices 216-2 and 216-3 are outside of this communication range.

A second concentric circle 224-2 corresponds to an intermediate-range communication mode of mobile device 212 and may include, for example, WiFi™ communications. Thus, the diameter of second concentric circle 224-2 may be approximately 100 meters to signify the range over which these and other local area devices normally communicate. WiFi™ access points 220 located within second concentric circle 224-2 are potentially within a communication range of mobile device 212, whereas WiFi™ access points 220 located outside first concentric circle 224-1 may be beyond the communication range of mobile device 212. As illustrated, two WiFi™ access points 220-1, 220-2 are within a likely communication range of mobile device 212 whereas another WiFi™ access point 220-3 is outside of this communication range.

A third concentric circle 224-3 corresponds to a longer-range communication mode of mobile device 212. The third concentric circle 224-3 includes base station 208. In this embodiment, the base station 208 is a fully functioning cellular base station or another wide area transceiver able to exchange voice and/or data communications in a communication mode of mobile device 212.

In some embodiments, even longer-range communication modes may be also supported by the mobile device 212, for example, satellite 228 communication. In this case, other measurement techniques, such as a signal strength, may be used to determined whether satellite 224 is within communication range of mobile device 212. An even larger concentric circle would be configured for the satellite 228.

Mobile device 212 sends identifying information to base station 208 (or some other transceiver) upon detecting that it is within a communication range of the base station 208. After receiving identifying information, base station 208 retrieves a location of mobile device 212 and identifies transceiver devices for inclusion in the multimodal list. Although, in some embodiments, base station 208 has access to transceiver device information for a large number of transceivers, it may select only those transceivers within a likely communication range of mobile device 212 for inclusion in the multimodal list. As illustrated, these transceivers may include Bluetooth™ device 216-1, WiFi™ access points 220-1, 220-2 and base station 208. Generally, the multimodal list includes transceiver devices for communicating in at least two different communication modes.

In the preceding embodiment, base station 208 generated the multimodal list and transmitted it to mobile device 212. It is understood, however, that these activities may be performed by any of the various transceiver devices or by any combination of transceiver devices. Thus, for example, the multimodal list of transceiver devices might be generated by a computer connected to a wireless wide-area network and transmitted to a mobile device located within a communication range of the wireless wide-area network. Similarly, a WiFi™ access point may be configured to provide a multimodal list of transceivers to mobile devices located within its communication range. A mobile device located in overlapping communication ranges may potentially receive multimodal lists in each of its communication modes.

Not every mobile device 212 supports every communication mode for the transceiver devices 208, 210, 216, 220, 228. In this embodiment, a WiFi™ base station 210 is not supported by the mobile device 212. WiFi™ base stations 210 might be excluded from the multimodal list for the mobile device 212. Alternatively, the multimodal list may include the WiFi™ base station 210 and just be ignored by the mobile device 212.

Figure 3A:
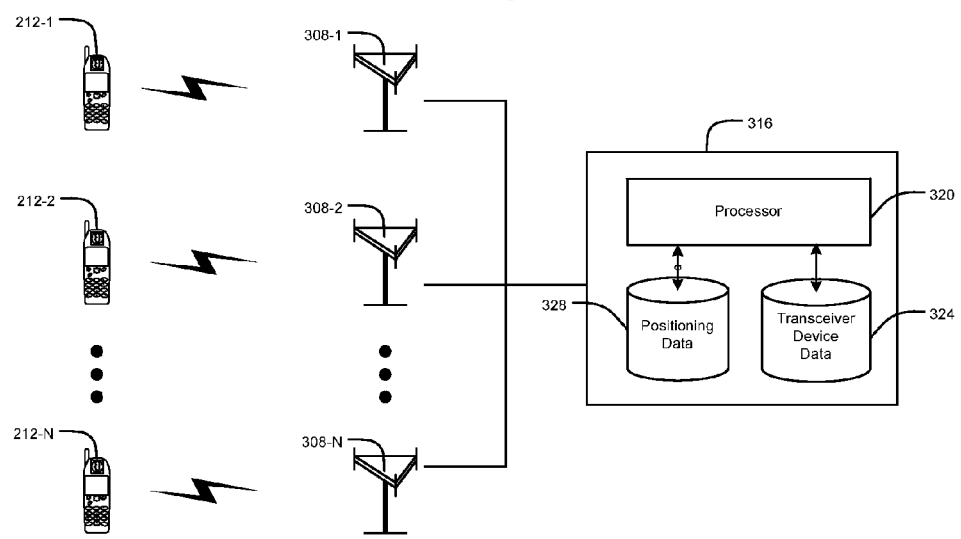
FIGS. 3A and 3B show base stations in communication with a base station controller as part of a multimodal communication system.

FIG. 3A shows a multimodal communication system including an arrangement of base stations 308 communicating with a base station controller 316. Mobile devices 212 communicate with base stations 308 according to their respective locations. Base stations 308, in turn, communicate with base station controller 316, which is responsible for generating the multimodal list of transceiver devices. The base station controller 316 includes a processor 320, positioning data 328 and transceiver device data 324.

In this embodiment, individual base stations 308 provide identifying data from mobile devices 212 to base station controller 316. Processor 320 located within base station controller 316 is configured to generate a multimodal list of transceiver devices using information contained in one more databases or otherwise recorded on a storage medium. Thus, for example, processor 320 may query positioning data database 328 and indicate a location of a mobile device. This query may return transceiver device identifiers for all transceiver devices within a likely communication range of the mobile device location regardless of whether the mobile device can communicate in all those transceiver devices.

Processor 320 may then query a database of transceiver device information 324 with the transceiver identifiers to retrieve a list of the communication modes the mobile device 212 is capable of using. Base station controller 316 may cull the transceiver devices returned from the positioning data database 328 according to the communication modes of the mobile device to determine a multimodal list. The tailored multimodal list is returned to the base station 308 for transmission to the mobile device 212. The multimodal list of transceiver devices transmitted to the mobile device 212 generally includes transceiver devices for communicating in at least two different communication modes. In an alternative embodiment, a mobile switch center or some other core network entity may be responsible for generating the multimodal list of transceiver devices.

Figure 3B:
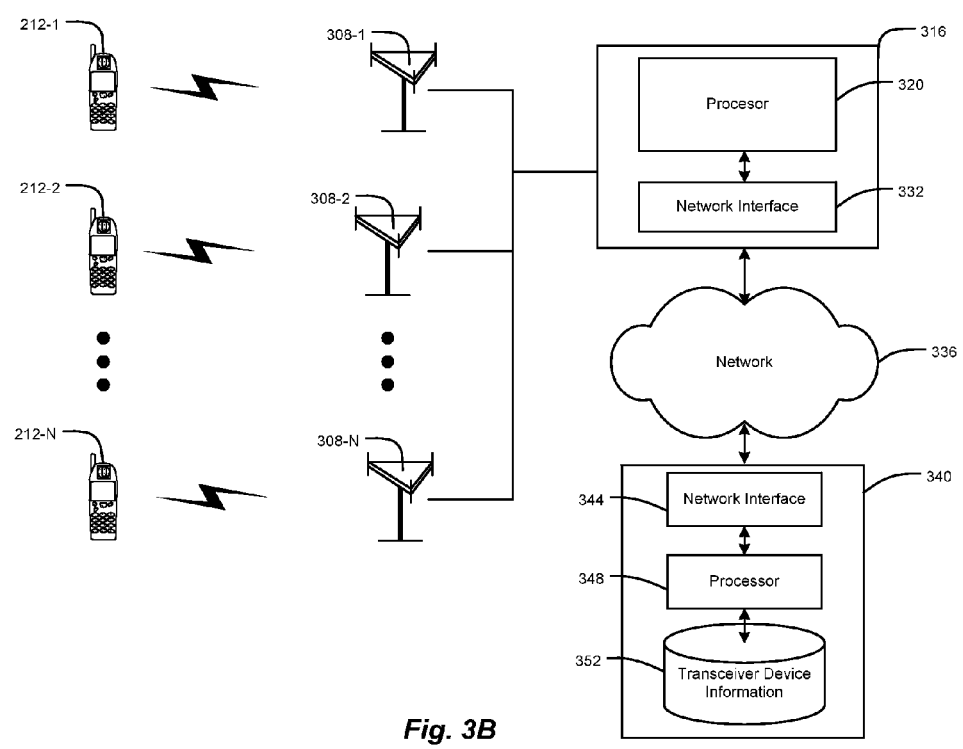

FIG. 3B shows a further embodiment of a multimodal communication system in which base stations 308 communicate with a base station controller 316. In this embodiment, base station controller 316 is networked to data source 340. Network interface 332 receives commands and data from processor 320 and transmits them via network 336. These commands may represent requests for multimodal lists of transceivers. The data may include information identifying the requesting base station 308 and the mobile device 212 for which the multimodal list is to be generated.

Data source 340 may be adapted to receive commands and data from multiple base station controllers 316 at its network interface 344. This feature may enable implementation of a hierarchical coverage scheme. For example, an individual base station 308 may be responsible for receiving identifying information from mobile devices 212 in a particular cellular region. Base stations 308 serving one or more cellular regions may communicate with a designated base station controller 316. Groups of base station controllers 316 may serve a particular geographic area, and data source 340 may contain transceiver device information for all known transceivers located in the geographic area.

Data source 340 includes network interface 344, processor 348 and transceiver device database 352. Transceiver device database 352 may include one or more databases accessible to processor 348. These databases may be recorded on various storage media. In general, transceiver device database 352 will include an identifier and a geographic location. However, data source 340 may also store additional information, including communication mode(s), availability and usage statistics, for each transceiver device entry. Network 336 may be a circuit switch network, a packet switch network and/or an IP network.

Figure 4A:
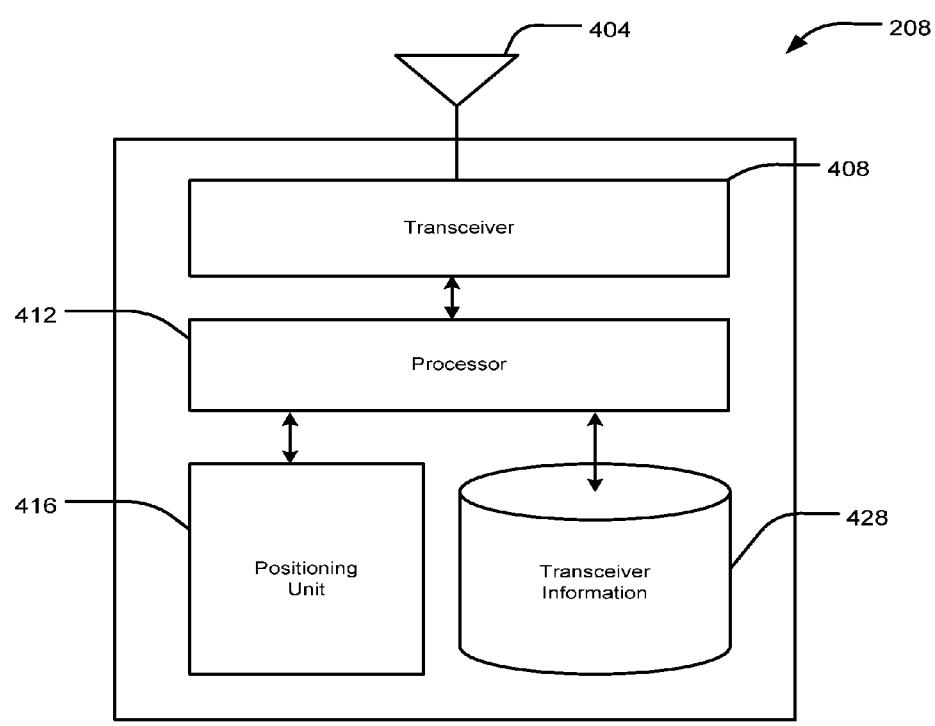
FIGS. 4A and 4B are block diagrams depicting base stations configured to operate in a multimodal communication system.

FIG. 4A is a block diagram of a base station 208 configured to operate in a multimodal communication system. Base station 208 includes antenna 404 and transceiver 408 for exchanging communications with mobile devices 212. As illustrated, transceiver 408 operates in a single communication mode. This embodiment may, for example, represent a cellular base station that has been configured to generate a multimodal list of transceiver devices. Base station 208 receives identifying information from a mobile device 212. This identifying information is transmitted within a communication range of the base station 208 and using the communication mode of the base station 208.

Processor 412 receives the identifying information from transceiver 408 and activates positioning unit 416. Positioning unit 416 determines an approximate geographic location of the mobile device 212 and returns positioning data to processor 412. Positioning unit 416 may determine the location of the mobile device by using global positioning satellite system and/or relying on terrestrial range finding signals. In some embodiments, positioning data is included with the identifying information received from the mobile device 212. Thus, for example, a mobile device 212 may assist base station 208 to locate its position by providing base station 208 with information about other transceiver devices in its operating environment.

Processor 412 identifies transceiver units within a likely communication range of the mobile device 212 by querying transceiver information database 428. Transceiver information database 428 stores transceiver device information for a plurality of transceivers communicating in various communication modes. For example, among other things, transceiver information database 428 may include transceiver information for cellular base stations, radio access networks, wireless wide-area networks, WiFi™ access points, Bluetooth™ devices, and personal area networks. Each entry in transceiver information database 428 may include a transceiver device identifier, a location of the transceiver device, and a communication mode(s) of the transceiver device.

In some embodiments, transceiver information database 428 stores positioning data corresponding to a likely communication region for each transceiver device. The communication region may be centered at the physical location of the transceiver device and sized according to a communication mode of the transceiver device. In some embodiments, the communication region is expressed as a set of positioning coordinates that define a region inclosing all points within a likely communication range of the transceiver device. Thus, for example, transceiver information database 428 may contain an entry for a WiFi™ access point including a set of positioning coordinates that define a communication region represented by a circle comprising all points within 100 meters of where the access point is located. Using positioning data from positioning unit 416, processor 412 may determine whether a mobile device is located within this communication region. If the mobile device is within the communication region, information about the transceiver may be included in a multimodal list of transceiver devices. Otherwise, processor 412 may determine that that the transceiver device is not within a likely communication range of the mobile device. In this case, information about the transceiver device would not be included in the multimodal list. In another embodiment, the positioning unit 416 and/or transceiver information database 428 may be remotely connected to the base station 208 using a network, for example.

After transceivers within a likely communication range of the mobile device have been identified, processor 412 generates a multimodal list containing transceiver device information. The multimodal list includes information about transceiver devices for communicating in at least two different communication modes and may include a transceiver identifier and a communication mode for each transceiver device. In some embodiments, processor 412 filters the transceiver devices determined to be within a communication range of a mobile device according to communication modes of the mobile device. For example, a mobile device may supply a list of its communication modes with the identifying information provided to base station 208. Processor 412 may exclude transceiver devices that do not communicate in a communication mode of the mobile from the multimodal list. This tailored multimodal list is then transmitted from base station 208 to the mobile device.

Figure 4B:
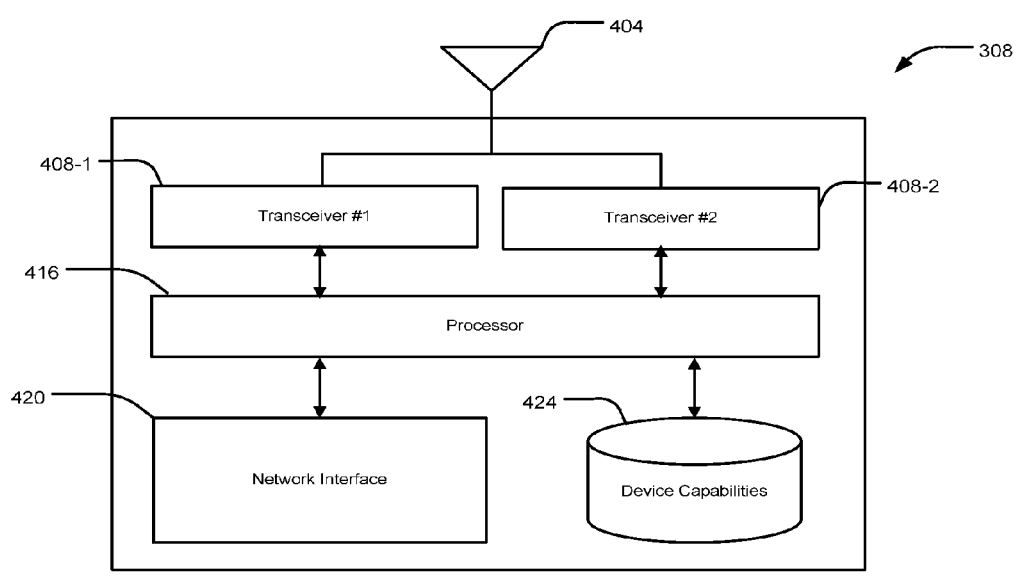

FIG. 4B is a further embodiment of a base station configured to operate in a multimodal communication system. Base station 308 includes two transceivers 408-1, 408-2 corresponding to different communication modes and also includes device capabilities database 424 for determining communication modes of a mobile device. In this embodiment, base station 308 receives identifying information containing a shorthand description of a mobile device. The identifying information may further include positioning data for the mobile device. Processor 416 queries device capabilities database 424 with the shorthand description to determine communication modes of the mobile device. Positioning information and a list of communication modes for the mobile device is sent over a network via network interface 420. In some embodiments, network interface 420 connects base station 308 to a base station controller which is responsible for identifying transceiver devices within a likely communication range of the mobile device. Processor 416 receives transceiver device information from network interface 420, generates a multimodal list including transceivers for communicating in at least two different communication modes, and transmits the multimodal list to the mobile device.

Figure 5A:
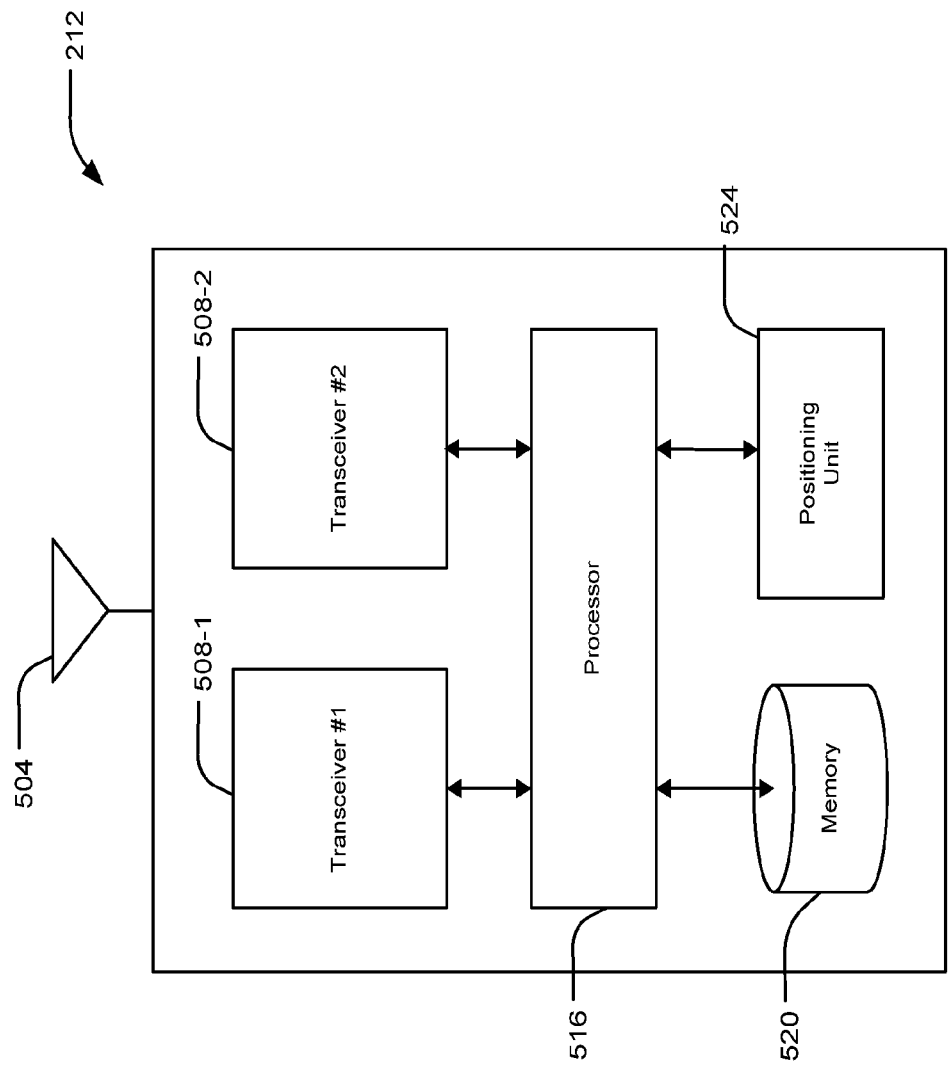
FIGS. 5A and 5B are block diagrams depicting mobile devices configured to operate in a multimodal communication system.

FIG. 5A is a block diagram of a mobile device configured to operate in a multimodal communication system. Mobile device 212 includes antenna 504 and separate transceivers 508-1, 508-2 for communicating in two different communication modes. Processor 516 coordinates the exchange of voice and/or data communications through transceivers 508-1, 508-2 and is configured to receive a multimodal list of transceiver devices in either or both of the communication modes. Receiving the multimodal list may involve a sequence of steps that are performed by processor 516 upon activation of the mobile device and at various intervals as the mobile device changes location. Upon activation, for example, processor 516 may listen for base stations in each communication mode. The order in which mobile device 212 listens for base stations may be controlled by device settings or user preferences. For example, a user may specify a preferred communication mode or may express a preference for communicating with a nearest transceiver device in any supported communication mode. When a base station is detected, processor 420 causes identifying information about mobile device 212 to be transmitted by the transceiver 508 associated with the communication mode in which the base station was detected. In some embodiments, the identifying information may be stored in memory 520 and may include a list of communication modes supported by the mobile device 212. In another example, each transceiver may come with its own antenna optimized for a communication mode supported by the transceiver.

Mobile device 212 tracks its location with positioning unit 524 and may include positioning data as part of the identifying information it transmits to a detected base station. In some embodiments, positioning unit 524 receives positioning data from a global positioning satellite and may periodically update the positioning data as its location changes. In other embodiments, positioning unit 524 includes a ranging signal for determining the location of mobile device 212 relative to other transceivers in its operating environment. In yet another embodiment, positioning unit 524 determines the identification of the transceiver (or identifications of multiple transceivers) whereby this identification information is used to determine the approximate location of the mobile device 212.

Processor 516 is also configured to process a multimodal list of transceiver devices. The multimodal list of transceiver devices includes information about transceiver devices for communicating in at least two different communication modes. Transceiver device information generally includes a transceiver identifier and a communication mode for each transceiver device. In some embodiments, the multimodal list may contain information about transceiver devices that do not communicate in a communication mode of the mobile device. In this case, processor 516 filters the multimodal list of transceiver devices according to communication modes of the mobile device. Processor 516 stores the processed multimodal list in memory 520.

Figure 5B:
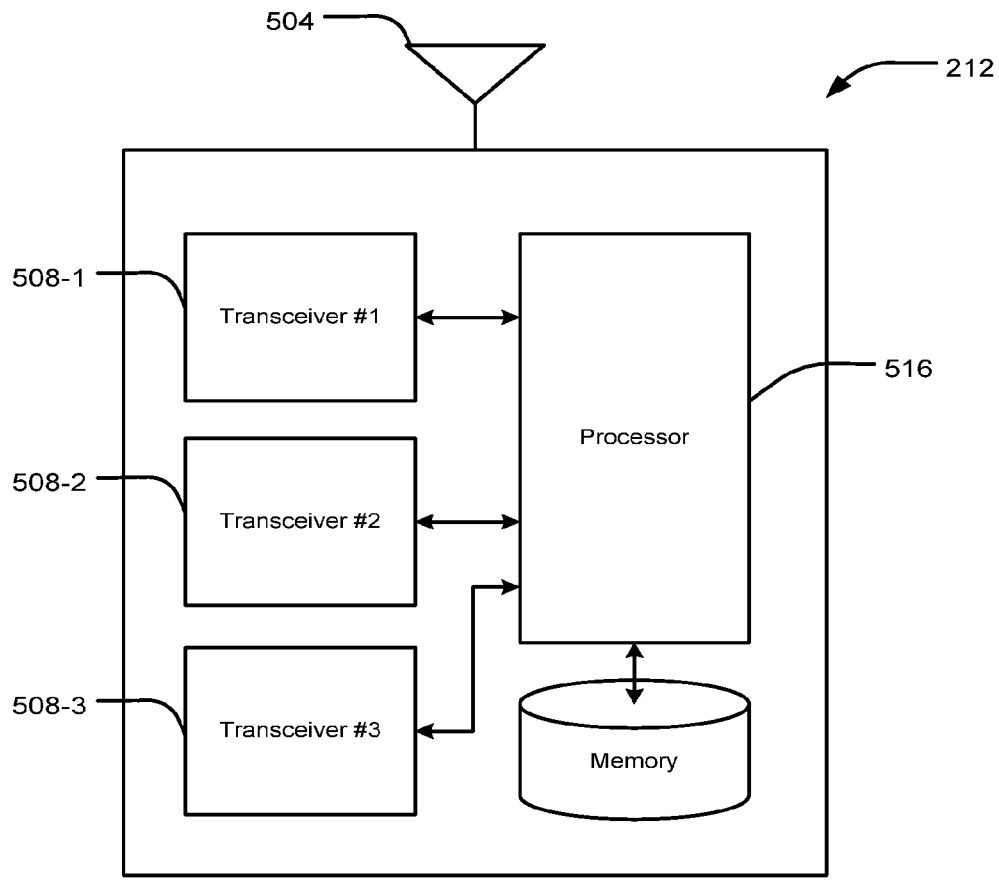

FIG. 5B is a further embodiment a mobile device configured to operate in a multimodal communication system. Mobile device 212 includes separate transceivers 508-1, 508-2, 508-3 for communicating in three different communication modes. In this embodiment, mobile device 212 does not include a positioning unit and must therefore rely upon other transceivers to determine its position.

Figure 6A:
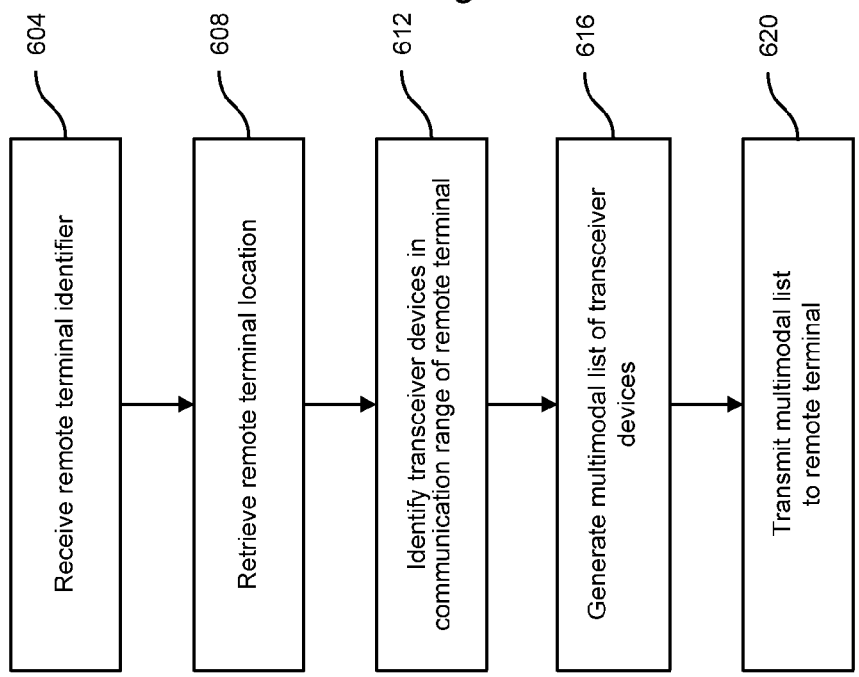

FIG. 6A is a flow diagram illustrating a process of providing a multimodal list of transceiver devices to a remote terminal or mobile device. In a first block 604, a remote terminal identifier is received. The remote terminal identifier is received in a communication mode of a remote terminal and may represent a plurality of communication modes of the remote terminal. Using the remote terminal identifier, a location of the remote terminal is determined and retrieved in block 608. Various methods of locating the remote terminal are possible, including the use of satellite and/or terrestrial positioning signals.

In a next block 612, transceiver devices within a communication range of the remote terminal are identified. A database of transceiver device information may be accessed to determine transceiver devices within a likely communication range of the remote terminal. The communication range of each transceiver device is determined according to a communication mode of the transceiver device and may extend radially from the physical location of the transceiver device. If the remote terminal is located within this communication range, the transceiver device may be identified for inclusion in the multimodal list. Otherwise, the transceiver device may not be identified for inclusion in the multimodal list.

In a next block 616, the multimodal list of transceiver devices is generated. The multimodal list includes transceiver devices for communicating in at least two different communication modes and may include all or a subset of the transceiver devices identified in the preceding block. The multimodal list of communication devices is then transmitted in block 620 to the mobile device using a communication mode of the remote terminal.

FIG. 6B is a flow diagram illustrating another process of providing a multimodal list of transceiver devices to a remote terminal. This process includes a block 610 that retrieves capabilities of the remote terminal. In this block, communication modes of the remote terminal are determined. Communication modes of the remote terminal are used to refine the block of identifying transceiver devices 612 so that only transceiver devices within a communication range of a supported communication mode are selected for inclusion in the multimodal transceiver devices. In this way, the multimodal list of transceiver devices can be tailored to the capabilities of the remote terminal.

When multimodal lists are generated in some embodiment, the communication range is used. The communication range corresponds to the signal coverage for communication purposes. We note that a transceiver signal coverage for positioning purposes (i.e., positioning range) can be significantly different from the signal coverage for communication purposes (i.e., communication range). Some embodiments may use positioning range when determining multimodal lists. Although we use the "communication range" in parts of the description, the communication range terminology can be alternatively defined as the positioning range in various embodiments.

FIG. 7 is a flow diagram of a process by which transceiver devices are identified for communicating with a remote terminal. In a first block 704, an identifier is transmitted in a first communication mode. The identifier may represent a request for a multimodal list of transceiver devices and may contain information about the remote terminal. For example, information about the remote terminal may include an address of the remote terminal and device capabilities of the remote terminal. Following transmission of the identifier, the process waits for acknowledgement. This may include listening on a particular operating frequency for an acknowledgement message addressed to the remote terminal. If the transmission is acknowledged in block 708, a multimodal list of transceiver devices is received in the first communication mode in block 712. The multimodal list is then stored in a memory in block 728 and the acquisition process terminates in block 732.

If the first transmission is not acknowledged, the identifier is retransmitted in a second communication mode in block 716. This may occur, for example, if a preset amount of time passes without acknowledgement in the first communication mode. After the identifier is transmitted in the second communication mode, the process waits for an acknowledgement in the second communication mode in block 720. If the acknowledgement is received, a multimodal list of transceiver devices is received in the second communication mode in block 724. The multimodal list is stored in a memory in block 728 and the acquisition process terminates in block 732. If, however, the transmission in the second communication mode is not acknowledged, the acquisition process terminates unsuccessfully in block 732. This process can continue for a preset number of retries either until acknowledgement is received in one of the communication modes or the total predetermined acquisition process is exceeded.

FIG. 8 is a block diagram of a system for providing a multimodal list of transceiver devices to a remote terminal. The system includes means for retrieving a location of a remote terminal 804 (e.g., a datalink, a wireless link, a database interface, a network) as well as means for identifying (e.g., a processor or state machine) a first transceiver device for communicating in a first communication mode and a second transceiver device for communicating in a second communication mode 808. The first and second transceiver devices are located within communication range of the remote terminal. The system also includes means for generating the multimodal list of transceiver devices (e.g., a processor or state machine) comprising the first and second transceiver devices 812. The multimodal list of transceiver devices contains, at least, a transceiver device identifier and a communication mode for each of the first and second transceiver devices. Means for transmitting (e.g., a wired or wireless communication link) the multimodal list of transceiver devices to the remote terminal are also provided 816.

FIG. 9 is a block diagram of a system for identifying transceiver devices for communicating with a remote terminal. The system includes means for communicating information away from the remote terminal 904, for example, a wireless transmitter of some configuration. The information communicated away from the terminal represents a plurality of communication modes of the remote terminal. Means for receiving a multimodal list of transceiver devices (e.g., a receiver of some sort) are included 908. The multimodal list of transceiver devices includes information about a first transceiver device for communicating in a first communication mode and information about a second transceiver device for communicating in a second communication mode. The multimodal list of transceiver devices is tailored to a location of the remote terminal or a geographic region associated with the location of a remote terminal. The system also includes means for storing (e.g., a storage medium) the multimodal list of transceiver devices 912 in a memory accessible to the remote terminal.

Figure 10:
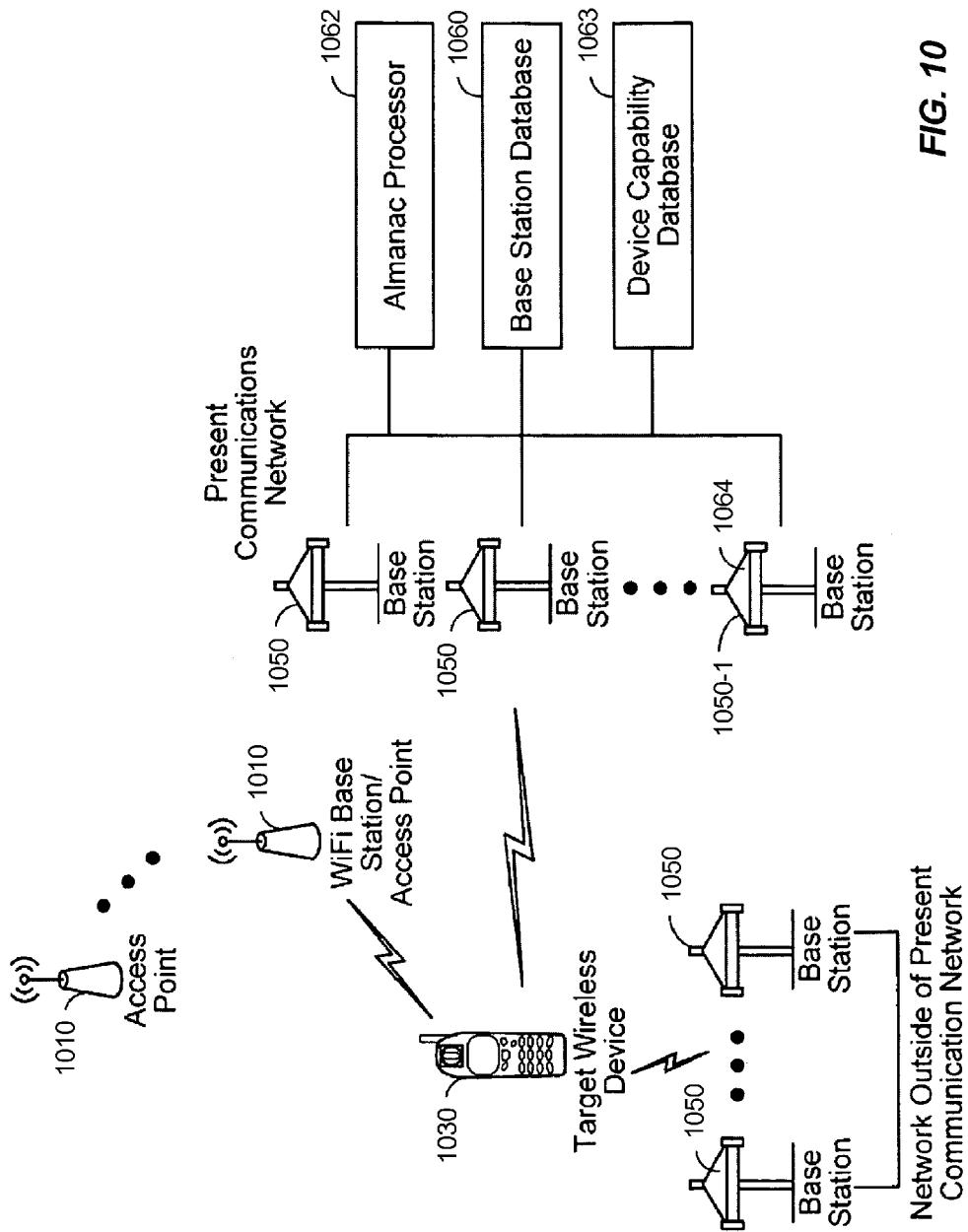
FIG. 10 is a diagram of an embodiment of a wireless communication system.

Another example embodiment of a system to provide a mobile/wireless device with information relating to at least two communication modes is provided in relation to FIG. 10, showing an example wireless communication system. In the embodiments of FIG. 10, either a centralized or a localized base station database 1060 can be maintained for the base stations of the supported and relevant modes of communication (for example, may not be interested in the OMEGA base stations).

The supported communication modes for each wireless device 1030 can be stored in a device capability database 1063 that includes information to help in determining an uncertainty factor for each location or distance measurement made by a particular wireless device operating in any number of communication modes.

An almanac processor 1062 may be separate from the base stations 1050 (as shown), but each base station 1050 or a group of base stations 1050 could have a base station almanac processor 1062 and/or databases in other embodiments. Alternatively, the almanac processor 1062 can be integrated into the wireless device 1030. The base station database 1060 and/or device capability database 1063 could also be in the wireless device 1030 and updated periodically.

In some embodiments, the base station database 1060 may be centrally located (as illustrated in FIG. 10), in others the base station database 1060 may be distributed regionally or in portions relevant to each base station 1050 or a group of base stations 1050 as a local almanac. For example, a first base station 1050-1, may store a portion of the base station database for its footprint and all adjacent base station footprints in a first local almanac 1064. In another example, the first almanac may not be geographically organized but contain the base stations which are part of a particular service provider network. As the centrally-located base station database 1060 is updated, those changes are propagated to the various local almanacs that might use the new information.

The target device 1030 having access to the relevant base station almanac will be able to determine the location information given the knowledge of the communication mode and the identification of the base station 1050 or a group of base stations 1050 in the communication with the target device 1030. The location determination can be performed either by the target device 1030 or with the target-device assistance. In the target device-assisted mode, the device 1030 provides the information sufficient for the location determination by the external entity.

To further improve the search of the base station almanacs for the appropriate information, the data can be organized utilizing the hierarchical coverage scheme. For a particular region, for example, the Bay Area, or area identified by SID/NID, the number of CDMA and GSM switches can be listed. Under each switch a number of GSM and CDMA base station controllers can be listed. For each base station controller a number of base stations are provided, for each base station a number of sectors (typically from 1 to 6). For each sector, the base station almanac can contain the number of known WiFi base stations (access points 1010) located within the coverage of the particular sector. The same can be done for other local area base stations such as Bluetooth, UWB, ZigBee, RFID, etc. This classification can be extended to show cross references whereby some of the local area base stations can be within the signal coverage of the other local are base stations providing further granularity to the location information. For example, a number of Bluetooth base stations can be within coverage of a particular WiFi access point 1010.

While the principles of the disclosure have been described above in connection with specific apparatuses and methods, it is to be clearly understood that this description is made only by way of example and not as limitation on the scope of the disclosure.

What is claimed is:

1. A method comprising:
receiving a request for information pertaining to network devices with which a multimode wireless device is configured to communicate;
accessing, in response to the request, a database containing base station information relevant to at least two network modes of operation of the multimode wireless device, the base station information contained in the database including information to assist position determination for the multimode wireless device for each of the at least two network modes of operation of the multimode wireless device, the information to assist position determination for the multimode wireless device including transceiver position information for at least one transceiver, for each of the at least two network modes of operation, determined to be within an associated positioning range from the multimode wireless device at which positioning operations can be performed, each of the at least one transceiver for each of the at least two network modes of operation further associated with a communication range, different from the associated positioning range, at which voice and data communication exchange can be performed, the transceiver position information transmitted to the multimode wireless device in response to the request so as to enable the multimode wireless device to determine the multimode wireless device's position based on the transceiver position information for each of the at least one transceiver, for each of the at least two network modes of operation, determined to be within the respective associated positioning range; and
transmitting the base station information relevant to the at least two network modes of operation to the multimode wireless device.

2. The method of claim 1, wherein the at least two network modes comprise: CDMA and EVDO.

3. The method of claim 1, wherein the at least two network modes comprise: CDMA and GSM/GPRS.

4. The method of claim 1, wherein the at least two network modes comprise: WCDMA and GSM/GPRS.

5. The method of claim 1, wherein the at least two network modes comprise: OFDM-based WiFi and TDMA-based WiFi.

6. The method of claim 1, wherein the at least two network modes comprise: OFDM and WCDMA.

7. The method of claim 1, wherein the at least two network modes comprise: OFDM and GSM/GPRS.

8. The method of claim 1, wherein the at least two network modes comprise: OFDM and CDMA.

9. The method of claim 1, wherein the at least two network modes comprise: CDMA and WiFi.

10. The method of claim 1, wherein the at least two network modes comprise: WCDMA and WiFi.

11. The method of claim 1, wherein the at least two network modes comprise: GSM/GPRS and WiFi.

12. The method of claim 1, wherein the at least two network modes comprise: CDMA and WiFi.

13. The method of claim 1, further comprising:
determining supported modes for the multimode wireless device from a device capability database.

14. The method of claim 1, wherein accessing the database containing the base station information comprises accessing a database organized according to a hierarchical coverage scheme.

15. The method of claim 14, wherein the hierarchical coverage scheme is organized according to one or more of: CDMA switches, or GSM switches.

16. The method of claim 1, wherein the database containing the base station information comprises a number of known WiFi access points within a particular base station sector.

17. The method of claim 1, wherein the database containing the base station information comprises information for at least one base station type selected from the group comprising Bluetooth, UWB, ZigBee, and RFID.

18. The method of claim 1, further comprising:
determining a position of the multimode wireless device based, at least in part, on the base station information relevant to the at least two network modes of operation.

19. The method of claim 1, wherein the database further comprises device capabilities information to assist position determination for the multimode wireless device, including information for each of the at least two networks modes of operation of the multimode wireless device to help determine corresponding uncertainty factors for location or distance measurements performed by the multimode wireless device operating in respective ones of the at least two network modes of operation.

20. The method of claim 1, wherein transmitting the base station information relevant to the at least two network modes of operation to the multimode wireless device comprises:
transmitting the base station information from a base station maintaining the base station database to the multimode wireless device in a base station network mode matching one of the at least two network modes of operation of the multimode wireless device, wherein the base station network mode on which the information is transmitted is determined by a process of initially sending the request, by the multimode wireless device to the base station, using different ones of the at least two network modes of operation until an acknowledgement is received from the base station in response to the base station receiving the request transmitted from the multimode wireless device in the base station network mode.

21. The method of claim 1, wherein the database comprises a plurality of entries for respective transceivers, each of the plurality of entries including a transceiver device identifier for a respective one of the transceivers, a location of the respective one of the transceivers, one or more communication modes for the respective one of the transceivers, and a likely communication region for the respective one of the transceivers.

22. A method comprising:
   transmitting a request for information pertaining to network devices with which a multimode wireless device is configured to communicate;
   receiving base station information relevant to at least two network modes of operation of the multimode wireless device, the base station information accessed from a database in response to the request, the base station information contained in the database including information to assist position determination for the multimode wireless device for each of the at least two network modes of operation of the multimode wireless device, the information to assist position determination for the multimode wireless device including transceiver position information for at least one transceiver, for each of the at least two network modes of operation, determined to be within an associated positioning range from the multimode wireless device at which positioning operations can be performed, each of the at least one transceiver for each of the at least two network modes of operation further associated with a communication range, different from the associated positioning range, at which voice and data communication exchange can be performed, the transceiver position information transmitted to the multimode wireless device in response to the request so as to enable the multimode wireless device to determine the multimode wireless device's position based on the transceiver position information for each of the at least one transceiver, for each of the at least two network modes of operation, determined to be within the respective associated positioning range; and
   determining the position of the multimode wireless device based, at least in part, on the base station information relevant to the at least two network modes of operation.

23. The method of claim 22, wherein the at least two network modes comprise: CDMA and EVDO.

24. The method of claim 22, wherein the at least two network modes comprise: CDMA and GSM/GPRS.

25. The method of claim 22, wherein the at least two network modes comprise: WCDMA and GSM/GPRS.

26. The method of claim 22, wherein the at least two network modes comprise: OFDM-based WiFi and TDMA-based WiFi.

27. The method of claim 22, wherein the at least two network modes comprise: OFDM and WCDMA.

28. The method of claim 22, wherein the at least two network modes comprise: OFDM and GSM/GPRS.

29. The method of claim 22, wherein the at least two network modes comprise: OFDM and CDMA.

30. The method of claim 22, wherein the at least two network modes comprise: CDMA and WiFi.

31. The method of claim 22, wherein the at least two network modes comprise: WCDMA and WiFi.

32. The method of claim 22, wherein the at least two network modes comprise: GSM/GPRS and WiFi.

33. The method of claim 22, wherein the database containing the base station information comprises information for at least one base station type selected from the group comprising Bluetooth, UWB, ZigBee, and RFID.

34. The method of claim 22, wherein the database accesses is organized according to a hierarchical coverage scheme.

35. The method of claim 22, further comprising:
   storing the received base station information relevant to the at least two network modes of operation of the multimode wireless device on storage media of the multimode wireless device.

36. A wireless communication apparatus comprising:
   one or more processors;
   storage media comprising computer instructions that, when executed on the one or more processors, cause operations of:
      receiving a request for information pertaining to network devices with which a multimode wireless device is configured to communicate;
      accessing, in response to the request, a database containing base station information relevant to at least two network modes of operation of the multimode wireless device, the base station information contained in the database including information to assist position determination for the multimode wireless device for each of the at least two network modes of operation of the multimode wireless device, the information to assist position determination for the multimode wireless device including transceiver position information for at least one transceiver, for each of the at least two network modes of operation, determined to be within an associated positioning range from the multimode wireless device at which positioning operations can be performed, each of the at least one transceiver for each of the at least two network modes of operation further associated with a communication range, different from the associated positioning range, at which voice and data communication exchange can be performed, the transceiver position information transmitted to the multimode wireless device in response to the request so as to enable the multimode wireless device to determine the multimode wireless device's position based on the transceiver position information for each of the at least one transceiver, for each of the at least two network modes of operation, determined to be within the respective associated positioning range; and
      transmitting the base station information relevant to the at least two network modes of operation to the multimode wireless device.

37. The apparatus of claim 36, wherein the at least two network modes comprise: CDMA and EVDO.

38. The apparatus of claim 36, wherein the at least two network modes comprise: CDMA and WiFi.

39. The apparatus of claim 36, wherein the at least two network modes comprise: OFDM-based WiFi and TDMA-based WiFi.

40. The apparatus of claim 36, wherein the at least two network modes comprise one or more of: CDMA and GSM/GPRS, WCDMA and GSM/GPRS, OFDM and WCDMA, OFDM and GSM/GPRS, OFDM and CDMA, WCDMA and WiFi, or GSM/GPRS and WiFi.

41. The apparatus of claim 36, wherein the storage media further comprises computer instructions to cause the further operations of:
   determining supported modes for the multimode wireless device from a device capability database.

42. The apparatus of claim 36, wherein the database containing base station information comprises information for at least one base station type selected from the group comprising Bluetooth, UWB, ZigBee, and RFID.

43. A multimode wireless device comprising:
   one or more processors;
   storage media comprising computer instructions that, when executed on the one or more processors, cause operations of:

transmitting a request for information pertaining to network devices with which the multimode wireless device is configured to communicate;

receiving base station information relevant to at least two network modes of operation of the multimode wireless device, the base station information accessed from a database in response to the request, the base station information contained in the database including information to assist position determination for the multimode wireless device for each of the at least two network modes of operation of the multimode wireless device, the information to assist position determination for the multimode wireless device including transceiver position information for at least one transceiver, for each of the at least two network modes of operation, determined to be within an associated positioning range from the multimode wireless device at which positioning operations can be performed, each of the at least one transceiver for each of the at least two network modes of operation further associated with a communication range, different from the associated positioning range, at which voice and data communication exchange can be performed, the transceiver position information transmitted to the multimode wireless device in response to the request so as to enable the multimode wireless device to determine the multimode wireless device's position based on the transceiver position information for each of the at least one transceiver, for each of the at least two network modes of operation, determined to be within the respective associated positioning range; and determining the position of the multimode wireless device based, at least in part, on the base station information relevant to the at least two network modes of operation.

44. The device of claim 43, wherein the at least two network modes comprise: CDMA and EVDO.

45. The device of claim 43, wherein the at least two network modes comprise: CDMA and WiFi.

46. The device of claim 43, wherein the at least two network modes comprise: OFDM-based WiFi and TDMA-based WiFi.

47. The device of claim 43, wherein the at least two network modes comprise one or more of: CDMA and GSM/GPRS, WCDMA and GSM/GPRS, OFDM and WCDMA, OFDM and GSM/GPRS, OFDM and CDMA, WCDMA and WiFi, or GSM/GPRS and WiFi.

48. The device of claim 43, wherein the database containing base station information comprises information for at least one base station type selected from the group comprising Bluetooth, UWB, ZigBee, and RFID.

49. The device of claim 43, wherein the database accesses is organized according to a hierarchical coverage scheme.

50. The device of claim 43, wherein the storage media further comprises computer instructions to cause the further operations of:

storing the received base station information relevant to the at least two network modes of operation of the multimode wireless device on the storage media of the multimode wireless device.

51. A wireless communication apparatus, comprising:

means for receiving a request for information pertaining to network devices with which a multimode wireless device is configured to communicate;

means for accessing, in response to the request, a database containing base station information relevant to at least two network modes of operation of the multimode wireless device, the base station information contained in the database including information to assist position determination for the multimode wireless device for each of the at least two network modes of operation of the multimode wireless device, the information to assist position determination for the multimode wireless device including transceiver position information for at least one transceiver, for each of the at least two network modes of operation, determined to be within an associated positioning range from the multimode wireless device at which positioning operations can be performed, each of the at least one transceiver for each of the at least two network modes of operation further associated with a communication range, different from the associated positioning range, at which voice and data communication exchange can be performed, the transceiver position information transmitted to the multimode wireless device in response to the request so as to enable the multimode wireless device to determine the multimode wireless device's position based on the transceiver position information for each of the at least one transceiver, for each of the at least two network modes of operation, determined to be within the respective associated positioning range; and means for transmitting the base station information relevant to the at least two network modes of operation to the multimode wireless device.

52. The apparatus of claim 51, wherein the at least two network modes comprise: CDMA and EVDO.

53. The apparatus of claim 51, wherein the at least two network modes comprise: CDMA and WiFi.

54. The apparatus of claim 51, wherein the at least two network modes comprise: OFDM-based WiFi and TDMA-based WiFi.

55. The apparatus of claim 51, wherein the at least two network modes comprise one or more of: CDMA and GSM/GPRS, WCDMA and GSM/GPRS, OFDM and WCDMA, OFDM and GSM/GPRS, OFDM and CDMA, WCDMA and WiFi, or GSM/GPRS and WiFi.

56. The apparatus of claim 51, further comprising:

means for determining supported modes for the multimode wireless device from a device capability database.

57. The apparatus of claim 51, wherein the database containing base station information comprises information for at least one base station type selected from the group comprising Bluetooth, UWB, ZigBee, and RFID.

58. A multimode wireless apparatus comprising:

means for transmitting a request for information pertaining to network devices with which a multimode wireless device is configured to communicate;

means for receiving base station information relevant to at least two network modes of operation of the multimode wireless device, the base station information accessed from a database in response to the request, the base station information contained in the database including information to assist position determination for the multimode wireless device for each of the at least two network modes of operation of the multimode wireless device, the information to assist position determination for the multimode wireless device including transceiver position information for at least one transceiver, for each of the at least two network modes of operation, determined to be within an associated positioning range from the multimode wireless device at which positioning operations can be performed, each of the at least one transceiver for each of the at least two network modes of operation further associated with a communication range, different from the associated positioning range, at which voice and data communication exchange can be performed, the transceiver position information transmitted to the multimode wireless device in response to the request so to enable the multimode wireless device to determine the multimode wireless device's position based on the transceiver position information for each of the at least one transceiver, for each of the at least two network modes of operation, determined to be within the respective associated positioning range; and means for determining the position of the multimode wireless device based, at least in part, on the base station information relevant to the at least two network modes of operation.

59. The apparatus of claim 58, wherein the at least two network modes comprise: CDMA and EVDO.

60. The apparatus of claim 58, wherein the at least two network modes comprise: CDMA and WiFi.

61. The apparatus of claim 58, wherein the at least two network modes comprise: OFDM-based WiFi and TDMA-based WiFi.

62. The apparatus of claim 58, wherein the at least two network modes comprise one or more of: CDMA and GSM/GPRS, WCDMA and GSM/GPRS, OFDM and WCDMA, OFDM and GSM/GPRS, OFDM and CDMA, WCDMA and WiFi, or GSM/GPRS and WiFi.

63. The apparatus of claim 58, wherein the database containing base station information comprises information for at least one base station type selected from the group comprising Bluetooth, UWB, ZigBee, and RFID.

64. The apparatus of claim 58, wherein the database accesses is organized according to a hierarchical coverage scheme.

65. The apparatus of claim 58, further comprising:

means for storing the received base station information relevant to the at least two network modes of operation of the multimode wireless device on storage media of the multimode wireless apparatus.

66. A non-transitory computer readable media programmed with a set of instructions executable on a processor that, when executed, cause operations comprising:

receiving a request for information pertaining to network devices with which a multimode wireless device is configured to communicate;

accessing, in response to the request, a database containing base station information relevant to at least two network modes of operation of the multimode wireless device, the base station information contained in the database including information to assist position determination for the multimode wireless device for each of the at least two network modes of operation of the multimode wireless device, the information to assist position determination for the multimode wireless device including transceiver position information for at least one transceiver, for each of the at least two network modes of operation, determined to be within an associated positioning range from the multimode wireless device at which positioning operations can be performed, each of the at least one transceiver for each of the at least two network modes of operation further associated with a communication range, different from the associated positioning range, at which voice and data communication exchange can be performed, the transceiver position information transmitted to the multimode wireless device in response to the request so as to enable the multimode wireless device to determine the multimode wireless device's position based on the transceiver position information for each of the at least one transceiver, for each of the at least two network modes of operation, determined to be within the respective associated positioning range; and transmitting the base station information relevant to the at least two network modes of operation to the multimode wireless device.

67. The computer readable media of claim 66, wherein the at least two network modes comprise: CDMA and EVDO.

68. The computer readable media of claim 66, wherein the at least two network modes comprise: CDMA and WiFi.

69. The computer readable media of claim 66, wherein the at least two network modes comprise: OFDM-based WiFi and TDMA-based WiFi.

70. The computer readable media of claim 66, wherein the at least two network modes comprise one or more of: CDMA and GSM/GPRS, WCDMA and GSM/GPRS, OFDM and WCDMA, OFDM and GSM/GPRS, OFDM and CDMA, WCDMA and WiFi, or GSM/GPRS and WiFi.

71. The computer readable media of claim 66, wherein the set of instructions further comprises instructions that cause the operations of:

determining supported modes for the multimode wireless device from a device capability database.

72. The computer readable media of claim 66, wherein the database containing base station information comprises information for at least one base station type selected from the group comprising Bluetooth, UWB, ZigBee, and RFID.

73. A non-transitory computer readable media programmed with a set of instructions executable on a processor that, when executed, cause operations comprising:

transmitting a request for information pertaining to network devices with which a multimode wireless device is configured to communicate;

receiving base station information relevant to at least two network modes of operation of the multimode wireless device, the base station information accessed from a database in response to the request, the base station information contained in the database including information to assist position determination for the multimode wireless device for each of the at least two network modes of operation of the multimode wireless device, the information to assist position determination for the multimode wireless device including transceiver position information for at least one transceiver, for each of the at least two network modes of operation, determined to be within an associated positioning range from the multimode wireless device at which positioning operations can be performed, each of the at least one transceiver for each of the at least two network modes of operation further associated with a communication range, different from the associated positioning range, at which voice and data communication exchange can be performed, the transceiver position information transmitted to the multimode wireless device in response to the request so as to enable the multimode wireless device to determine the multimode wireless device's position based on the transceiver position information for each of the at least one transceiver, for each of the at least two network modes of operation, determined to be within the respective associated positioning range; and determining the position of the multimode wireless device based, at least in part, on the base station information relevant to the at least two network modes of operation.

74. The computer readable media of claim 73, wherein the at least two network modes comprise: CDMA and EVDO.

75. The computer readable media of claim 73, wherein the at least two network modes comprise: CDMA and WiFi.

76. The computer readable media of claim 73, wherein the at least two network modes comprise: OFDM-based WiFi and TDMA-based WiFi.

77. The computer readable media of claim 73, wherein the at least two network modes comprise one or more of: CDMA and GSM/GPRS, WCDMA and GSM/GPRS, OFDM and WCDMA, OFDM and GSM/GPRS, OFDM and CDMA, WCDMA and WiFi, or GSM/GPRS and WiFi.

78. The computer readable media of claim 73, wherein the database containing base station information comprises information for at least one base station type selected from the group comprising Bluetooth, UWB, ZigBee, and RFID.

79. The computer readable media of claim 73, wherein the database accesses is organized according to a hierarchical coverage scheme.

80. The computer readable media of claim 73, wherein the set of instructions further comprises instructions that cause the operations of:
   storing the received base station information relevant to the at least two network modes of operation of the multimode wireless device on the storage media of the multimode wireless device.

* * * * *